United States Patent [19]
Itoh et al.

[11] Patent Number: 5,991,183
[45] Date of Patent: Nov. 23, 1999

[54] POLYPHASE VOLTAGE CONVERTER

[75] Inventors: Junichi Itoh; Koetsu Fujita, both of Tokyo, Japan

[73] Assignee: Fuji Electric Co., Ltd., Japan

[21] Appl. No.: 09/189,295

[22] Filed: Nov. 10, 1998

[30] Foreign Application Priority Data

Nov. 10, 1997 [JP] Japan .................................. 9-306695

[51] Int. Cl.$^6$ .................................................. H02M 7/06
[52] U.S. Cl. .......................................................... 363/126
[58] Field of Search .................................. 363/52, 53, 84, 363/87, 89, 125, 126, 127

[56] References Cited

U.S. PATENT DOCUMENTS

| | | | |
|---|---|---|---|
| 4,302,806 | 11/1981 | Baker | 363/126 |
| 4,982,316 | 1/1991 | Nakayama | 363/53 |
| 5,506,766 | 4/1996 | Takahashi | 363/126 |

FOREIGN PATENT DOCUMENTS

| | | | |
|---|---|---|---|
| 1246547 | 1/1960 | France | 363/126 |
| 1453558 | 10/1965 | France | 363/126 |
| 26 59 564 | 6/1978 | Germany | 363/126 |

*Primary Examiner*—Matthew Nguyen
*Attorney, Agent, or Firm*—Rossi & Associates

[57] ABSTRACT

A polyphase voltage type converter is provided in which ac switches are provided between a power supply and a diode bridge, and reactors that are star-connected are connected to input terminals of the diode bridge. The ac switches are turned on and off so that non-continuous current flows through each of the reactors, whereby input current is formed into a sinusoidal waveform even with a dc voltage lower than that of a conventional converter.

19 Claims, 4 Drawing Sheets

POLYPHASE VOLTAGE CONVERTER

FIELD OF THE INVENTION

The present invention relates to high-power-factor sinewave converters for converting ac voltage into dc voltage, and also forming ac input current into a sinusoidal waveform with a high power factor.

BACKGROUND OF THE INVENTION

A polyphase circuit in the form of a three-phase circuit will be described by way of example with reference to FIG. 9, which illustrates a known example of the above type of converter. The circuit of FIG. 9, which is called a single-switch step-up converter, includes a diode bridge 3, a smoothing capacitor 4, a power supply 6, reactors 51 connected to the inputs of the diode bridge 3, and a step-up chopper 52 that consists of a semiconductor switch and a diode. When the semiconductor switch is turned on, the power supply 6 is short-circuited through the reactors 51, so that the input current is formed into a desired waveform.

While the operating waveform will be described later, the switch is controlled so that non-continuous currents flow through the reactors 51 connected to the inputs of the diode bridge 3, whereby the converter develops dc current from the ac currents, while controlling the input current of each phase to be in the shape of a sinusoidal wave.

In the known circuit, the current generated upon turn-off of the semiconductor switch is not proportional to the input voltage, and therefore the input current is not formed into a sinusoidal waveform unless the output voltage is controlled to be twice or three times the maximum level of the power supply voltage. In view of the high output voltage, the switching element and diode bridge are required to have a high breakdown voltage, which causes an increase in the cost of the resulting converter. Also, the output voltage becomes as high as about 600 to 900 V, thus making it impossible for this type of converter to be used in applications where relatively low output voltage is needed. In addition, since no charge is stored in the smoothing capacitor 4 upon starting of the converter, an initial charging circuit need be provided in case of occurrence of rush current.

SUMMARY OF THE INVENTION

It is therefore an object of the present invention to provide a polyphase voltage converter having a simple, inexpensive structure, which is able to form power supply current into sinusoidal waveform with a high power factor.

To accomplish the above object, the present invention provides a polyphase voltage converter wherein ac switches are connected between input terminals of a diode bridge and a power supply, and reactors that are star-connected are connected to the input terminals of the diode bridge.

The converter of the present invention as described above is constructed so that no current passes through the power supply when the energy stored in the reactors upon short-circuiting of the power supply is discharged. Namely, the power supply voltage is short-circuited through the reactors when the ac switches are turned on, and the energy is stored in the reactors. When the ac switches are turned off, the energy stored in the reactors is supplied to a load through the diode bridge. Since no current passes through the power supply when the switches are in the OFF state, the power supply current consists solely of current that is proportional to the power supply voltage and flows when the switches are closed, and therefore sinewave-shaped current can be obtained irrespective of the output voltage.

BRIEF DESCRIPTION OF THE DRAWINGS

The invention will be described in greater detail with reference to preferred embodiments thereof and the accompanying drawings, wherein.

DETAILED DESCRIPTION OF THE PREFERRED EMBODIMENTS

Figure 1:
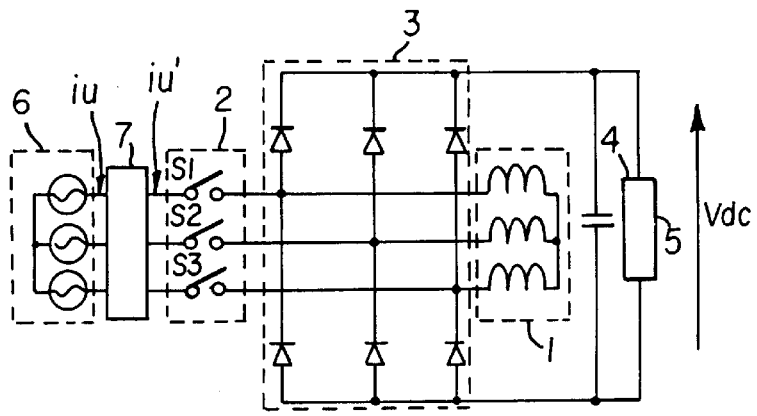
FIG. 1 is a circuit diagram showing the first embodiment of the present invention.

FIG. 1 shows a polyphase voltage converter constructed according to the first embodiment of the present invention. The circuit of FIG. 1 includes reactors 1 for storing energy, a set of ac switches 2, diode bridge 3, smoothing capacitor 4, dc load 5, three-phase voltage source or power supply 6, and a high-frequency filter 7. It is to be understood that the high-frequency filter 7 is not necessarily provided, but may be eliminated in some cases. The ac switches are constructed by combining semiconductor switches.

The ac switches 2 are connected to the three-phase voltage source 6 via the high-frequency filter 7, and the input terminals of the diode bridge 3 are connected to the other ends of the ac switches 2. The reactors 1 that are star-connected are connected to the input terminals of the diode bridge 3. The smoothing capacitor 4 is connected to the output terminals of the diode rectifying circuit 3, and the dc load 5 is connected in parallel to the smoothing capacitor 4.

Three switches S1, S2, S3 of the ac switch set 2 are controlled by the same pulses so that non-continuous currents pass through the reactors 1. When the three switches are all in the ON-state, the power supply voltage is short-circuited by the reactors 1. In this state, the input currents (output currents of the filter 7) $i_u'$, $i_v'$ and $i_w'$ of the respective ac switches 2 are represented by:

$$i_u' = v_u \cdot T_{on}/L$$
$$i_v' = v_v \cdot T_{on}/L$$
$$i_w' = v_w \cdot T_{on}/L \quad (1)$$

where $v_u$, $v_v$, $v_w$ represent power supply voltages, L represents the inductance of the reactor 1, and $T_{on}$ represents the ON duration of the switches. It will be understood from the above expressions (1) that the input current of each phase increases with a slope proportional to the power supply voltage. When the switches are turned off, on the other hand, the energy stored in the reactors 1 is discharged toward the load 5, through the diode bridge 3. In this state, since the current does not pass through the power supply 6 with the switches being open, the currents flowing through the respective voltage sources are represented by the above expressions (1), and, when smoothed by the high-frequency filter 7, provide sinewave-shaped currents that are in synchronization with the corresponding power supply voltages.

Figure 9:
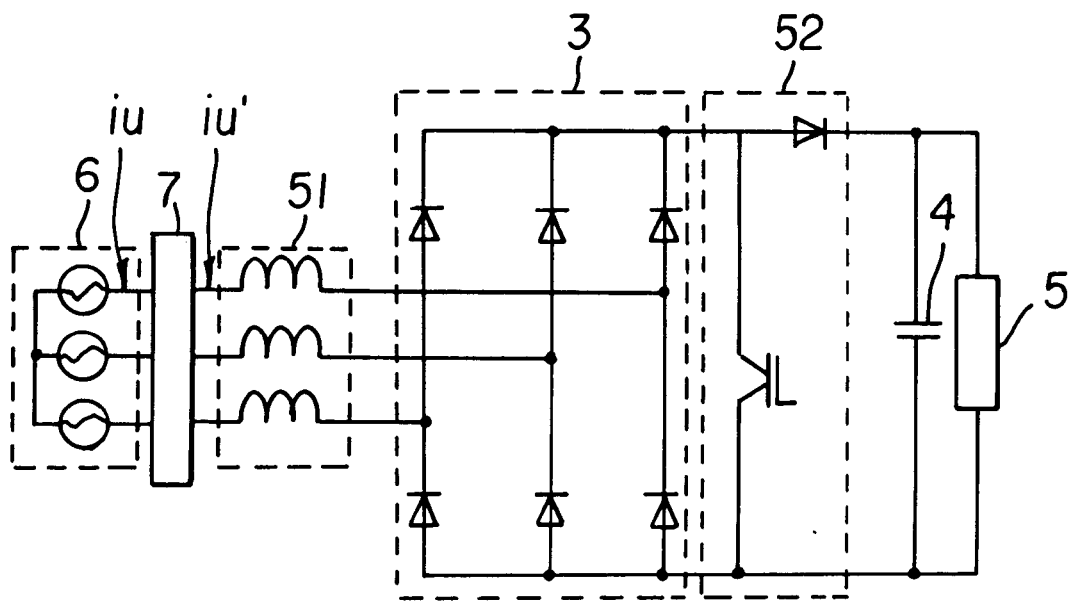
FIG. 9 is a circuit diagram showing a known example of converter.

Here, the relationship between the power supply currents $i_u$, $i_v$ and $i_w$ and the input currents (output currents of the filter 7) $i_u'$, $i_v'$ and $i_w'$ of the diode bridge 3 in the present embodiment is analyzed in comparison with that of the known example shown in FIG. 9.

Figure 2A:
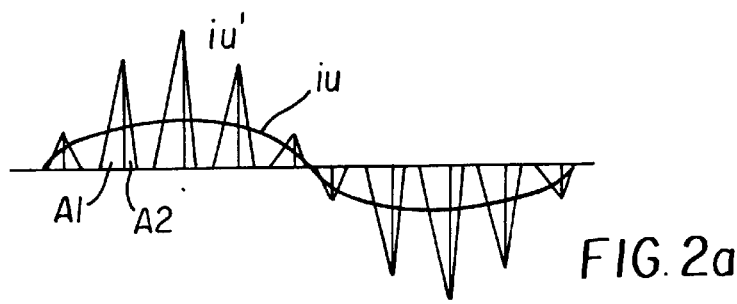
FIGS. 2(a)–2(c) are views useful in explaining an example of current waveform in the embodiment of FIG. 1, as compared with that of the conventional converter.

FIG. 2(a) shows an example of U-phase current waveform in the case of the known example. The output current $i_u'$ of the filter 7 is formed into continuous current as represented by $i_u$ by means of the high-frequency filter 7. Namely, $i_u$ provides the average value of $i_u'$.

If the semiconductor switch of the step-up chopper 52 is turned on in the example of FIG. 9, the power supply 6 is short-circuited via the reactors 51, and energy is supplied to the reactors 51. In this state, the U-phase current $i_u$, for example, is represented by the following expression (2) similar to the above expression (1):

$$i_u = v_u \cdot T_{on}/L \quad (2),$$

and the peak value of the current generated by one switching operation is proportional to the power supply voltage. Accordingly, the area denoted by "A1" in FIG. 2(a) is represented by an expression (3) as follows:

$$A1 = v_u \cdot T_{on}^2/2L \quad (3).$$

Thus, the area A1 is proportional to the power supply voltage if $T_{on}$ is constant.

On the other hand, the current generated upon turn-off of the semiconductor switch of the step-up (booster) chopper 52 in the example of FIG. 9 is represented by the following expression (4):

$$i_u = v_u \cdot T_{on}/L - (Vdc - v_u)Td/L \quad (4)$$

where Vdc represents output voltage, and Td represents the time it takes until the current becomes equal to zero. If the above expression (4) is solved in terms of Td, the following expression (5) will be derived:

$$Td = v_u \cdot T_{on}/(Vdc - v_u) \quad (5).$$

Accordingly, the area designated by "A2" in FIG. 2(a) is represented by:

$$A2 = v_u^2 \cdot T_{on}^2/2L(Vdc - v_u) \quad (6).$$

In this case, the area "A2" depends upon the output voltage Vdc, but is not proportional to the power supply voltage $v_u$. In the known converter, therefore, the current is formed into a sinusoidal waveform by sufficiently reducing the area "A2" with respect to the area "A1".

Figure 2B:
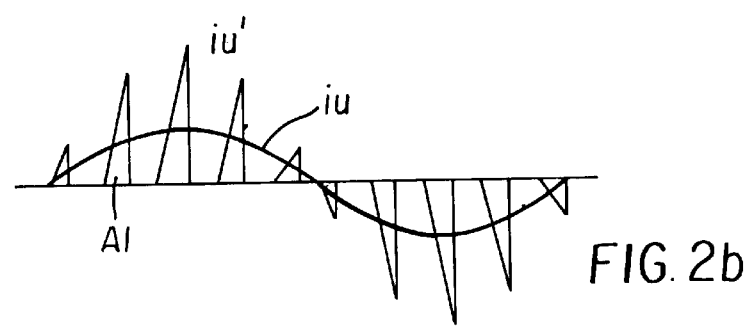
Figure 2C:

In the embodiment of the present invention as shown in FIG. 1, on the other hand, the set of ac switches 2 is connected to the power supply 6 so that the current is prevented from passing through the power supply when the switches are turned off. With this arrangement, the current $i_u'$ consists solely of A1 areas, as shown in FIG. 2(b), and the input current of the filter 7, or the power supply current $i_u$, takes the form of a sinusoidal wave even if the output voltage Vdc is small. The current iL that is generated from the U phase to the load when the switch is OFF takes the form shown in FIG. 2(c), and the A2 areas of the current are directly supplied from the reactor 1 to the load through the diode rectifier 3.

Figure 3:
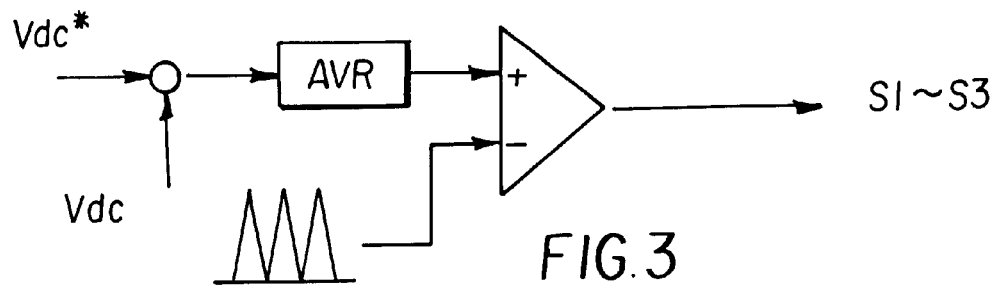
FIG. 3 is a schematic view showing an example of control method of the present invention.

FIG. 3 is a schematic view showing the method of controlling dc voltage in the embodiment of FIG. 1.

The dc voltage Vdc that is being detected is compared with its command value Vdc*, and a difference between Vdc and Vdc* is transmitted to a voltage adjuster (AVR). The output of the voltage adjuster is compared with a chopping wave, so as to obtain pulse-width-modulation (PWM) pulses. All of the three switches may be turned ON and OFF at the same time. The PWM pulses may be also obtained using a trapezoidal wave instead of the chopping wave, and a modulation method other than the pulse-width-modulation method may be employed.

Figure 4:
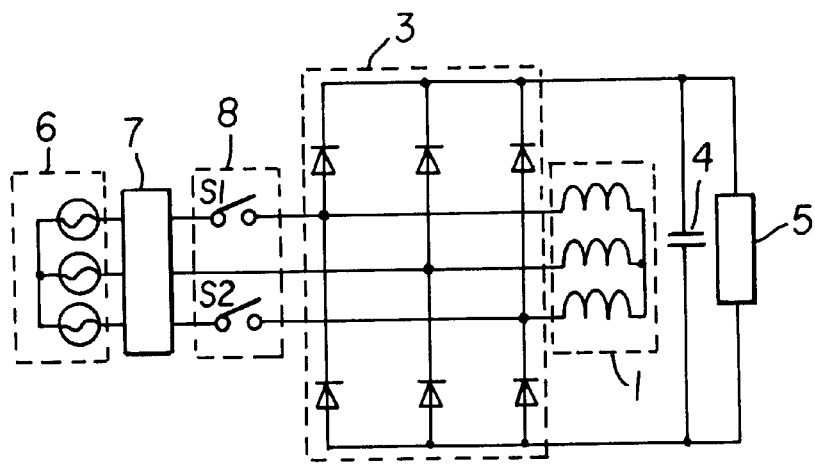
FIG. 4 is a circuit diagram showing the second embodiment of the present invention.

FIG. 4 is a circuit diagram showing the second embodiment of the present invention.

As is apparent from FIG. 4, a set of ac switches 8 that consists of two switches is used in place of the set of ac switches 2 as shown in FIG. 1. This embodiment is based on the principle that if two phases are controlled in the circuit of three-phase, three-line type, the remaining one phase is determined by the combination of the controlled two phases. This embodiment is identical with that of FIG. 1 in terms of the other aspects.

Figure 5:
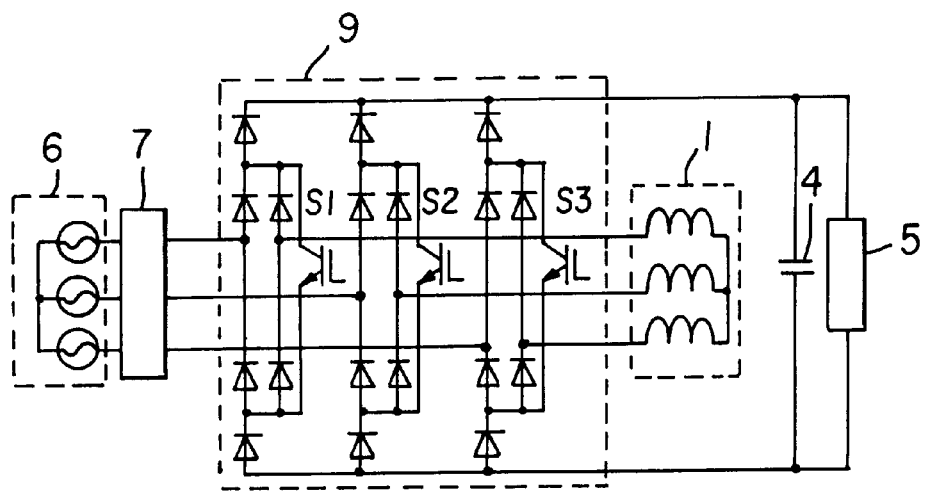
FIG. 5 is a circuit diagram showing the third embodiment of the present invention.

FIG. 5 is a circuit diagram showing the third embodiment of the present invention. This embodiment is characterized in that the ac switches are not used, but a set of semiconductor switches 9 consisting of diodes and semiconductor switches are provided. In this case, one semiconductor switch is used for each phase. The control method is similar to that of FIG. 1.

Figure 6:
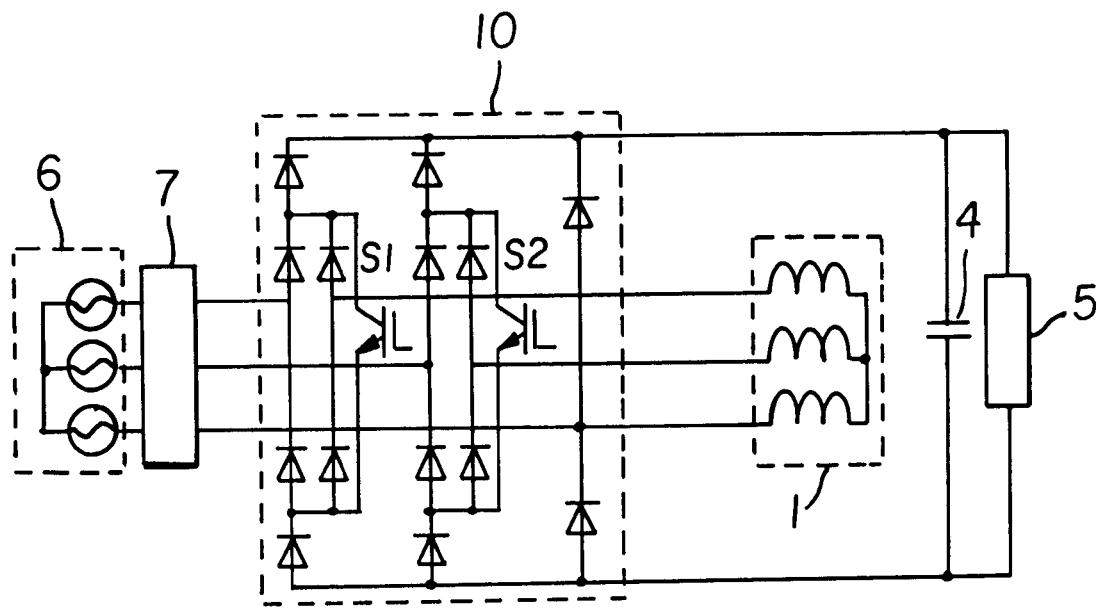
FIG. 6 is a circuit diagram showing the fourth embodiment of the present invention.

FIG. 6 is a circuit diagram showing the fourth embodiment of the present invention. This embodiment includes a circuit 10 having a set of two semiconductor switches 10 and a series circuit of two diodes, in place of the set of semiconductor switches 9 of FIG. 5. In this arrangement, the number of semiconductor switches used can be reduced by one, as compared with the embodiment of FIG. 5.

Figure 7:
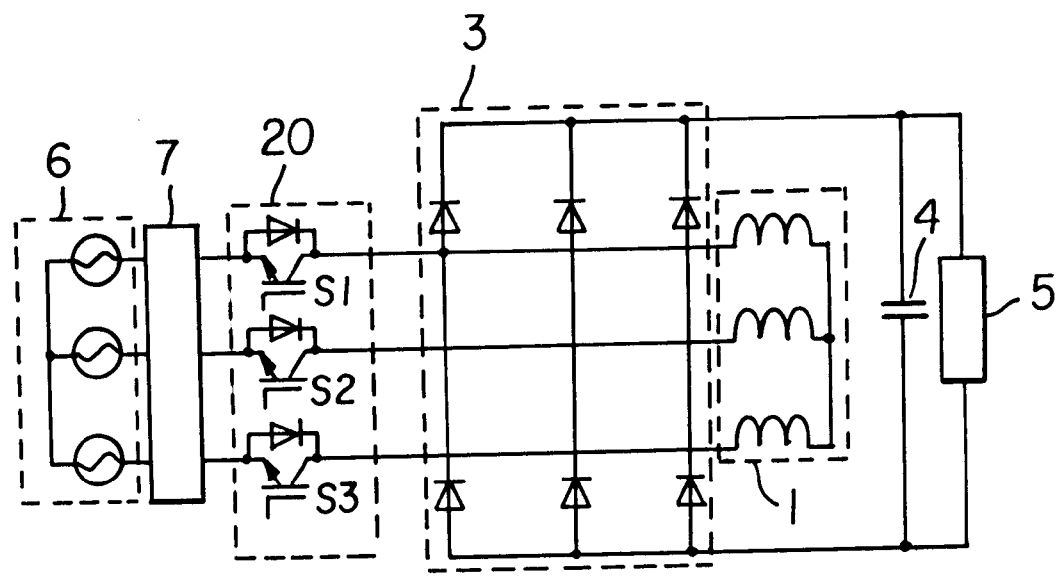
FIG. 7 is a circuit diagram showing the fifth embodiment of the present invention.

FIG. 7 is a circuit diagram showing the fifth embodiment of the present invention. This embodiment is characterized in that the ac switch set 2 of FIG. 1 is replaced by a set of semiconductor switches 20. If respective switching devices of the semiconductor switch set 20 are controlled to be turned ON and OFF at the same time, no power supply current flows when all of the switching devices are in the OFF state, and the current of every phase may flow in a certain direction when all of the devices are in the ON state. Thus, each switching device of the semiconductor switch set 20 may be considered as being equivalent to each switch of the ac switch set 2. The switching device may be oriented so that its emitter is located on the side of the power supply, or its emitter is located on the side of the input side of the diode bridge 3.

Figure 8:
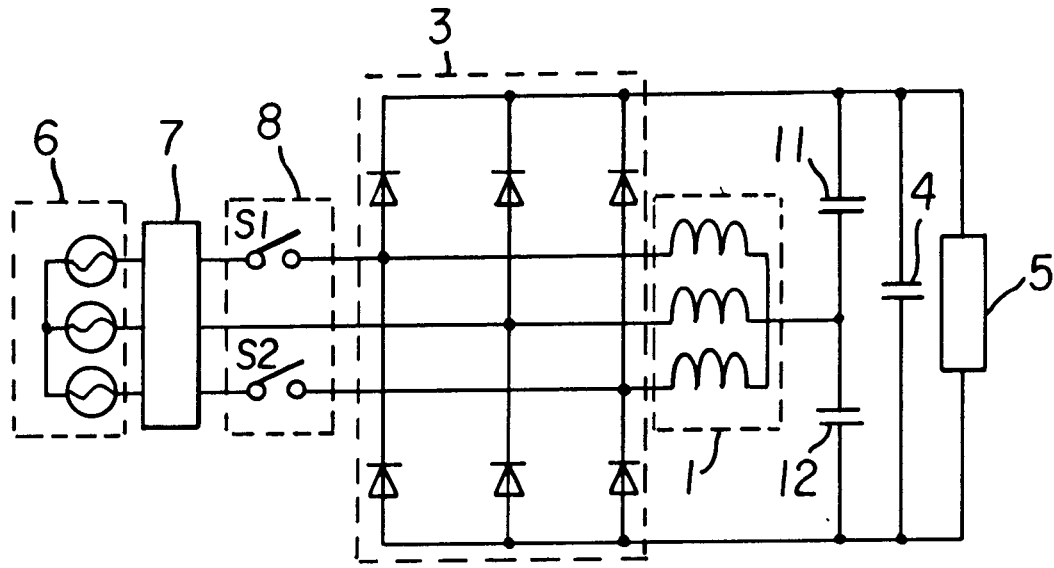
FIG. 8 is a circuit diagram showing the sixth embodiment of the present invention.

FIG. 8 shows the sixth embodiment of the present invention. This embodiment is different from that of FIG. 4 in that a series circuit of capacitors 11, 12 is provided, and the other ends of the reactors 1 is connected to the middle point of the series circuit. With this arrangement, the energy of the reactors 1 is stored in the capacitors 11, 12 due to half-wave rectification when the switches 8 are turned off, thus assuring an improved efficiency as compared with the embodiment of FIG. 4.

According to the present invention, the power supplies are short-circuited through the reactors when the switches are turned on, and the energy stored in the reactors is supplied to the load without passing through the power supplies when the switches are turned off, so that the input current can be formed into a sinusoidal waveform even with a lower dc voltage than that of the conventional converter. The control of the present converter may be performed in a considerably simple manner, only by turning on and off all of the switches at the same time. Thus, the present invention advantageously provides an inexpensive, high-power-factor converter that provides a wide range of output voltage.

What is claimed is:

1. A polyphase voltage type converter comprising:
   a power supply comprising an n-phase ac voltage source, where n is an integer equal to or greater than two;
   a diode bridge through which ac voltages from said n-phase ac voltage source are converted into a dc voltage;
   a plurality of switches provided between said power supply and input terminals of said diode bridge; and
   a plurality of reactors connected to the input terminals of said diode bridge;
   wherein said switches are controlled so that input current of each phase is formed into a sinusoidal waveform.

2. A polyphase voltage type converter as defined in claim 1, wherein said plurality of switches consist of (n) ac switches corresponding to each of the n-phases.

3. A polyphase voltage type converter as defined in claim 1, wherein said plurality of switches consist of (n-1) ac switches.

4. A polyphase voltage type converter for converting n phases of ac voltages into a dc voltage comprising:
   a power supply comprising a n-phase ac voltage source, where n is an integer equal to or greater than two;
   a set of semiconductor switches having a plurality of arms each comprising a first diode set in which first, second, third and fourth diodes are connected in series, a second diode set comprising a series circuit of two diodes and connected to the second and third diodes of said first diode set, and a semiconductor switching device connected in parallel to said second diode set; and
   a plurality of reactors that are connected to said semiconductor switches;
   wherein a middle point of said first diode set of each of said arms is connected to one end of said power supply, and a middle point of said second diode set of each of said arms is connected to one end of a corresponding one of said reactors, the other ends of said reactors being connected to each other, and
   wherein an input current of each phase is formed into a sinusoidal waveform by controlling said semiconductor switching device.

5. A polyphase voltage type converter as defined in claim 4, wherein said plurality of arms consist of n pieces of arms, where n represents the number of phases of said power supply.

6. A polyphase voltage type converter as defined in claim 4, wherein said plurality of arms consist of (n-1) pieces of arms corresponding to (n-1) phases of said power supply, and said converter further comprising a series circuit of two diodes that corresponds to a remaining one phase, said series circuit having a middle point connected to said power supply and a corresponding one of said reactors.

7. A polyphase voltage type converter as defined in claim 1, wherein each of said switches comprises a semiconductor switching device and a diode connected in parallel to the semiconductor switching device.

8. A polyphase voltage type converter as defined in claim 1, further comprising a series capacitor provided in a dc output portion of the converter, said series capacitor having a middle point that is connected to a middle point of said reactors.

9. A polyphase voltage type converter as defined in claim 4, further comprising a series capacitor provided in a dc output portion of the converter, said series capacitor having a middle point that is connected to a middle point of said reactors.

10. A polyphase voltage type converter as defined in claim 1, wherein said switches are controlled so that non-continuous current flows through said reactors.

11. A polyphase voltage type converter as defined in claim 4, wherein said semiconductor switching devices are controlled so that non-continuous current flows through said reactors.

12. A polyphase voltage type converter as defined in claim 1, wherein all of said switches are turned on and turned off at the same time.

13. A polyphase voltage type converter as defined in claim 4, wherein all of said semiconductor switching devices are turned on and turned off at the same time.

14. A polyphase voltage type converter as defined in claim 1, wherein said reactors are star-connected.

15. A polyphase voltage type converter as defined in claim 4, wherein said reactors are star-connected.

16. A polyphase voltage type converter as defined in claim 8, wherein said switches are controlled so that non-continuous current flows through said reactors.

17. A polyphase voltage type converter as defined in claim 9, wherein said semiconductor switching devices are controlled so that non-continuous current flows through said reactors.

18. A polyphase voltage type converter as defined in claim 8, wherein all of said switches are turned on and turned off at the same time.

19. A polyphase voltage type converter as defined in claim 9, wherein all of said semiconductor switching devices are turned on and turned off at the same time.

* * * * *